United States Patent

Chin

[15] 3,638,311

[45] Feb. 1, 1972

[54] NAVIGATIONAL CALCULATOR

[72] Inventor: Henry Chin, 1 Davida Road, Burlington, Mass. 01803

[22] Filed: May 20, 1970

[21] Appl. No.: 39,109

[52] U.S. Cl. ............................................. 33/1, 235/61 B, 235/89
[51] Int. Cl. ............................................. G09b 29/00, G06g 1/00
[58] Field of Search ................. 33/1 SD, 75 R, 1 R, 1 B, 104, 33/1 SP, 1 C; 235/89, 83, 61 NV, 61 GM, 61 B

[56] References Cited

UNITED STATES PATENTS

| 1,404,450 | 1/1922 | Lofland | 235/61 |
| 1,528,944 | 3/1925 | Newell | 235/61 |
| 1,840,568 | 1/1932 | Clark | 33/104 |
| 2,075,854 | 4/1937 | Karnes | 33/1 |
| 2,508,898 | 5/1950 | Stronstorff | 235/61 |
| 2,952,074 | 9/1960 | Gringorten | 33/1 |
| 3,206,113 | 9/1965 | Toy | 235/61 |
| 3,514,582 | 5/1970 | Sanderson | 235/61 |

FOREIGN PATENTS OR APPLICATIONS

| 452,777 | 11/1948 | Canada |
| 517,780 | 12/1920 | France |
| 840,947 | 1/1939 | France |
| 50,370 | 1/1940 | France |
| 543,520 | 3/1942 | Great Britain |

Primary Examiner—Robert B. Hull
Attorney—Joseph Weingarten

[57] ABSTRACT

A calculator for solving navigational problems, particularly adaptable for use by pilots of light planes. The calculator is a single sheet of flexible, transparent material having a set of curves which, when used in conjunction with a navigational chart, provide direct readings of speed, distance, time and direction.

6 Claims, 2 Drawing Figures

NAVIGATIONAL CALCULATOR

FIELD OF THE INVENTION

This invention relates generally to navigational aids and more particularly concerns a novel calculator for providing, in conjunction with a navigational chart, direct readings of speed, distance, time and direction.

DISCUSSION OF THE PRIOR ART

A large number of navigational aids have been developed over the years having varying degrees of utility. Many of these devices are of the slide rule type where various bits of information are used and the slide rule is manipulated to come up with specific answers to specific problems. Factors common to a large number of these prior navigational aids are that they must either be independently manipulated in the use of information derived from a chart or table or they must be substantially preplotted in the manner of a mileage chart on a road map. Others use an overlay of some type upon which a course may be plotted by such means as a grease pencil and straightedge.

An example of a partially preplotted calculating device is disclosed in U.S. Pat. No. 2,487,590 issued to Rehill. This device requires the use of a number of route cards, each having a plurality of known commercial air routes laid out in linear fashion, the distances between various points on the route depending upon the scale of the calculator. These route cards are used in conjunction with a nomograph device to provide mileage and flying time, knowing the ground speed. In order for this device to be useful, the various known routes must be preplotted on the route cards according to the mileage scale of the nomograph, that is, the mileage between each check point on the commercial route must be properly plotted in advance. There is no provision for determining direction or for determining distance and time in an emergency situation where the alternate emergency destination may not be plotted upon the route then in use.

The prior art devices may be stated to generally have one or more of the following characteristics: a significant amount of preplotting must be done as in Rehill; actual plotting of points with known inputs must be done with a pencil or grease pencil at the time of use; in any event, the device normally has moving parts which must be manipulated in some fashion in the manner of a circular or longitudinal slide rule in order to solve navigational problems.

SUMMARY OF THE INVENTION

Broadly speaking, this invention concerns a simplified navigational aid which itself has no moving parts except that is can be moved over the surface of a chart. This calculator is capable of providing ground speed, time for a particular leg of a journey and the total distance of that leg, knowing any one of the just named factors. The calculator of this invention is also capable of providing the heading to be taken between two points in addition to the other factors mentioned. The only thing that is necessary is to have a navigational chart with which this calculator can cooperate. No pencils or other marking devices are needed and nothing need be preplotted nor need any marks be made or courses laid out in order to obtain the desired information to solve a navigational problem.

This calculator is extremely advantageous for use by a pilot flying a small private aircraft because he may very quickly determine the flying time, heading and distance between where he is at any time and where he may wish to go, knowing only his ground speed. This is especially useful in emergency situations because there is no requirement that anything be preplotted or that any plotting at all be done. The device is therefore not only useful for determining navigational information prior to commencing a trip, but may be used at any time during the trip to update the navigational situation at hand.

BRIEF DESCRIPTION OF THE DRAWING

The invention will be more fully understood from the following detailed description taken in conjunction with the accompanying drawing, in which.

DESCRIPTION OF THE PREFERRED EMBODIMENTS

Figure 1:
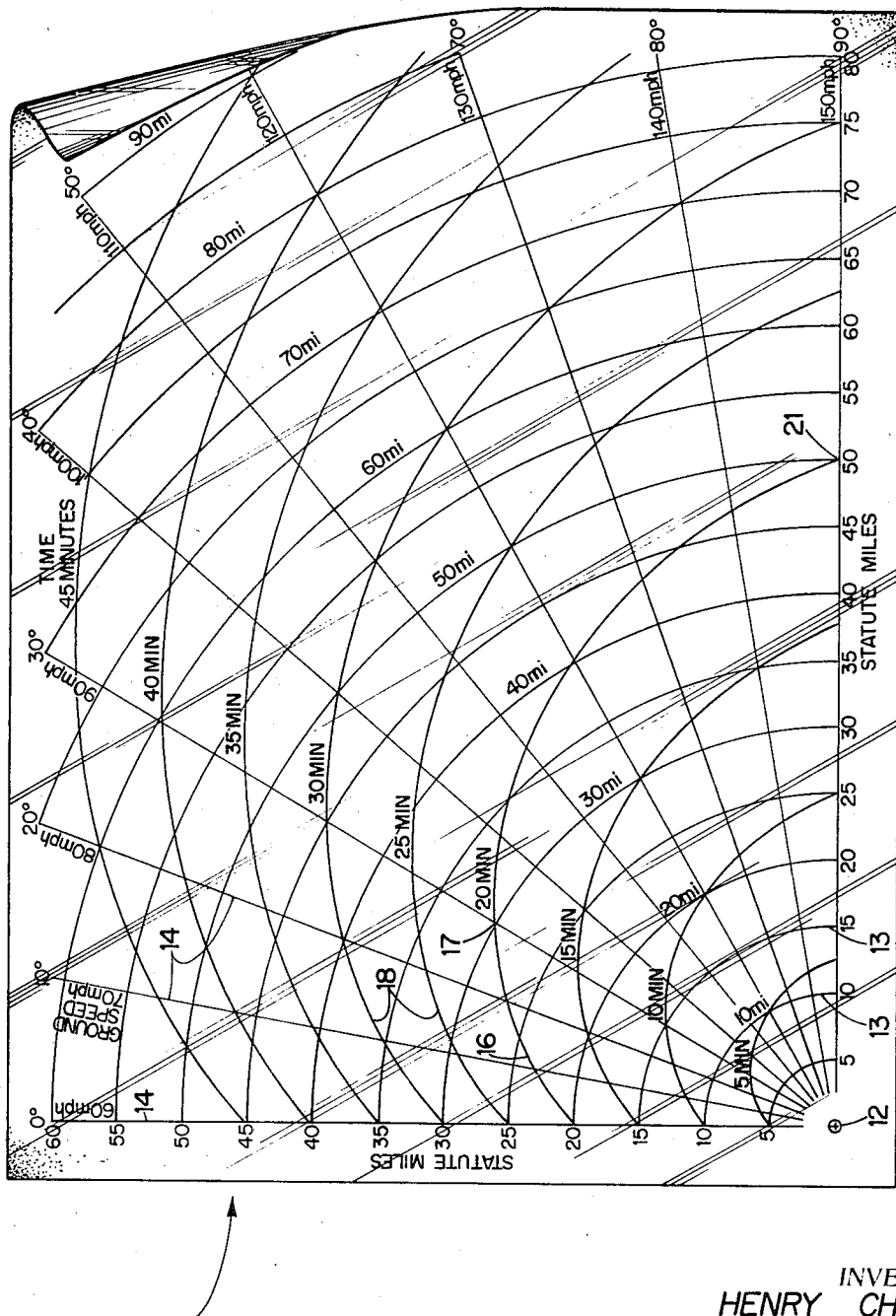
FIG. 1 shows a calculator constructed according to this invention, having a particular set of parameters imprinted thereon.

With reference now to the drawing, FIG. 1 shows the calculator 11 of this invention with a particular set of parameters imprinted thereon. This calculator is a relatively thin sheet of commercially available transparent flexible plastic material having its bottom surface very smooth and slippery and its top surface having a matte finish so that there is substantial friction at the top surface when the calculator is being moved by hand.

The calculator has a point of origin 12 located at its lower left-hand corner and distance scales extending orthogonally therefrom in two directions, in this case the scale being in statute miles. The left vertical scale is identical to the bottom horizontal scale. Curves 13 drawn between the vertical and the horizontal scales are concentric segments of circles of arcs with their center at point of origin 12. These curves are located at successive 5-mile intervals and extend outward over the entire surface of the calculator. Radial lines 14 extend outwardly from the point of origin 12 at predetermined angular intervals, the angular intervals in this case being 10°. Each radial 14 is labeled with a particular ground speed in 10 mile per hour increments, the vertical radial being designated "60 m.p.h.," and the horizontal radial being designated "150 m.p.h." Curves 18 are plotted on the surface of calculator 11, each one representing a constant time line, being spaced at intervals of 5 minutes and being labeled with the elapsed time it represents. With the speed and distance curves already located, the time for a particular distance at a particular speed is easily determined. By plotting a set of points for a constant time, for example, 20 minutes, time line 16 is drawn. It is immediately apparent that if the airplane is going at 90 miles per hour it will travel 30 miles in 20 minutes so that point 17 is located. If the aircraft is going at 150 miles per hour, it will travel 50 miles in 20 minutes, thereby locating point 21. By figuring the distance traveled in 29 minutes at each speed represented by radials 14, all of the points necessary for plotting time line 16 are determined. In a like manner, the remaining curves 18 are plotted. It turns out that curves 18 are segments of Archimedes spirals which are represented by the following formula:

$$T = d/s$$

where $T$ = a locus of an arbitrary constant time;
$d$ = distance between two points; and
$s$ = ground speed.

The distance and speed factors must be from the same measurement systems, such as miles and miles per hour or nautical miles and knots.

Figure 2:
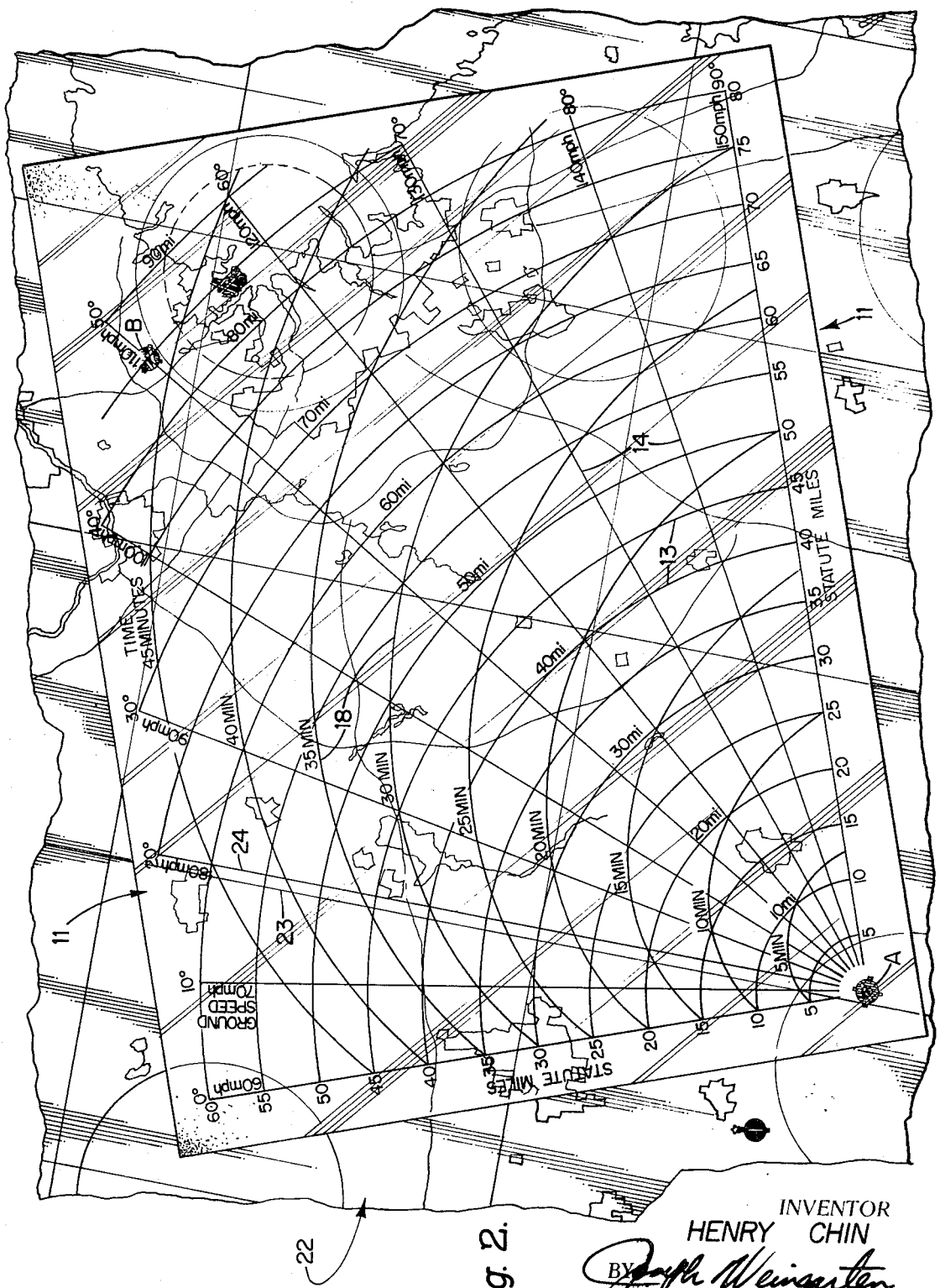
FIG. 2 shows the calculator of FIG. 1 being used in conjunction with a chart to solve a navigational problem.

Now with specific reference to FIG. 2, it will be shown how the calculator of FIG. 1 is used to solve a navigational problem for an airplane to get from point A to point B on chart 22. First it must be ascertained that the scale of calculator 11 is the same as that of chart 22. As an example, the chart os FIG. 2 is assumed to be a portion of a sectional aeronautical chart as published by the United States Coast and Geodetic Survey. This chart has a scale of 1 inch equals 50,000 inches. If other charts having different scales are to be used, then other calculators similar to that of FIG. 1 will have to be used with such charts. These calculators may be tab indexed or color coded or otherwise identified to match them for use with different charts.

It is is determined that the journey from point A to point B is to be made at 110 miles per hour, calculator 11 is placed over chart 22 such that origin 12 rests on point 1 and the "110 m.p.h." radial extends through point B. With this positioning, it is immediately apparent that the distance between point A and point B may be read directly or interpolated from curves 13 of the calculator. In this case point B rests on the 85-mile curve. Furthermore, by interpolation or direct reading, the time to travel between points A and B at the designated speed may be determined by use of curves 18. For this example the flight time would be approximately 47 minutes. Knowing that radials 14 are angularly spaced by 10+ increments, and by observing that radial 24 is substantially parallel to chart grid line 23, it may be easily determined that the true heading between points A and B is 030°. Since each navigational chart has imprinted thereon in various places the magnetic variation for that location, a simple mental calculation may be accomplished to determine the magnetic heading between points A and B. For example, if the magnetic variation at this point is 15° west, then the magnetic heading between points A and B will be 045°. If one of the radials 14 does not fall parallel to one of the chart grid lines 23, then calculator 11 may be rotated about its point of origin at point A until one of the radials lies parallel to or coincident with a chart grid line. Then by simply counting the number of angular increments to point B it is easily determined the heading to be taken between the two points. To facilitate usage of the computer as a protractor, each of the radial speed lines may be labeled with proper degree markings; in the example shown, these would be from 0° to 90° from the vertical scale to the horizontal scale.

As a further aid to the rapid and accurate usage of this calculator, the different families of curves may be color coded for immediate recognition. In this way the operator can easily distinguish the time curves from the distance curves to thereby increase the speed with which he solves a navigational problem.

Of course, it must be recognized that the particular parameters shown in the drawing need not be used. For example, instead of using statute miles as the basic scale, nautical miles, kilometers or whatever else is convenient may be used. The constant time spirals may be in other time increments and the speed radials are arbitrarily taken from 60 to 150 miles per hour, as shown. Furthermore, radials 14 may be plotted every 5° if desired in order to increase accuracy for the protractor usage of the calculator.

In order to facilitate use of the calculator by an individual pilot in a small plane, the side of the calculator facing and making contact with the chart is very shiny and smooth so that it slides very easily over the chart. The top of the calculator which is manually positioned is formed with a matte finish so that the amount of friction is substantially greater between the fingers and the matte finish than between the calculator and the chart. Thus, the calculator is easily positioned on the chart where desired. It is evident that the calculator of this invention may be used by a pilot while he is flying since it only requires one hand for operation and needs no marking devices in order to solve navigational problems.

Other modifications will likely occur to those skilled in this art which are within the scope of the invention. For example, the point of origin may be located elsewhere for convenience. The calculator could be made with a 180° span if desired. The speed radials need not include the degree markings. The important factors are that the scale of the calculator match that of the chart with which it is to be used, and that the sets of curves imprinted thereon maintain the relationships to one another and to the point of origin as described.

What is claimed is:

1. A navigational computing device for use with a navigational chart having a predetermined distance scale, said computing device comprising:
   a flexible transparent sheet having imprinted thereon a point of origin; a set of regularly angularly spaced radial lines radiating from said point of origin, said radial lines representing ground speed; a set of curves concentric with said point of origin and being regularly spaced therefrom, said curves representing distance; and a set of Archimedes spirals, each representing a constant time;
   the scale of said concentric curves corresponding to said predetermined distance scale.

2. The navigational computing device according to claim 1 wherein the location of said Archimedes spirals is dependent upon the parameters of said radial lines and said concentric curves.

3. A navigational computing device according to claim 2 wherein the Archimedes spirals are plotted according to the formula $$T=d/s$$

where
   $T=$ a locus of an arbitrary constant time;
   $d=$ the distance between two points; and
   $s=$ the ground speed used between said two points.

4. A navigational computing device according to claim 1 wherein the ends of said radial lines distal from said point of origin are marked with their appropriate degree markings to enable said computing device to operate as a protractor.

5. A navigational computing device according to claim 1 wherein said radial lines represent ground speed in miles per hour, said concentric curves represent distance in miles, and said Archimedes spirals represent time in minutes.

6. A navigational computing device according to claim 1 wherein one surface is smooth and relatively slippery, while the other surface is relatively rough.

* * * * *